United States Patent [19]

Cook, Jr. et al.

[11] Patent Number: 5,197,219

[45] Date of Patent: * Mar. 30, 1993

[54] ARTIFICIAL BAIT FOR FISH AND SHELLFISH

[75] Inventors: Harold T. Cook, Jr., Bainbridge Island; Mimi S. Fielding, Gig Harbor, both of Wash.

[73] Assignee: Marco Seattle, Inc., Seattle, Wash.

[*] Notice: The portion of the term of this patent subsequent to Nov. 5, 2008 has been disclaimed.

[21] Appl. No.: 707,470

[22] Filed: May 30, 1991

Related U.S. Application Data

[63] Continuation-in-part of Ser. No. 543,117, Jun. 22, 1990, Pat. No. 5,062,235.

[51] Int. Cl.$^5$ ............................................. A01K 85/00
[52] U.S. Cl. .................................... 43/42; 43/42.53; 43/42.06; 43/17.6
[58] Field of Search .................. 43/42, 42.53, 42.06, 43/17.6, 44.99; 426/1

[56] References Cited

U.S. PATENT DOCUMENTS

| | | | |
|---|---|---|---|
| D. 256,267 | 8/1980 | Stutzman | D22/27 |
| 2,874,048 | 2/1959 | Walldov | 426/104 |
| 3,650,766 | 3/1972 | Smadar | 99/100 |
| 3,684,519 | 8/1972 | Combs | 43/42.06 |
| 4,006,256 | 2/1977 | Kyros | 426/102 |
| 4,117,172 | 9/1978 | Bradshaw et al. | 426/516 |
| 4,119,739 | 10/1978 | Barwick et al. | 426/573 |
| 4,245,420 | 1/1981 | Carr | 43/42.06 |
| 4,347,261 | 8/1982 | Challen et al. | 426/573 |
| 4,348,420 | 9/1982 | Lynch et al. | 426/652 |
| 4,375,481 | 3/1983 | Kuwabara et al. | 426/93 |
| 4,463,018 | 7/1984 | Carr | 426/1 |
| 4,469,708 | 9/1984 | Rapp et al. | 426/103 |
| 4,576,821 | 3/1986 | Smith et al. | 426/1 |
| 4,666,717 | 5/1987 | Smith et al. | 426/1 |
| 4,731,247 | 3/1988 | Wolford et al. | 426/1 |
| 4,732,766 | 3/1988 | Lindgard | 426/1 |
| 4,748,026 | 5/1988 | Keefer et al. | 426/43 |
| 4,761,910 | 8/1988 | Ninomiya | 43/42.31 |
| 4,826,691 | 5/1989 | Prochnow | 43/42.28 |
| 4,828,829 | 5/1989 | Bethshears | 424/84 |
| 4,862,631 | 9/1989 | Wilson et al. | 43/42.33 |
| 4,867,989 | 9/1989 | Silva et al. | 426/5 |
| 4,882,174 | 11/1989 | Burreson et al. | 426/1 |
| 4,901,466 | 2/1990 | Davis | 43/4 |

FOREIGN PATENT DOCUMENTS

| | | |
|---|---|---|
| 251218 | 4/1963 | Australia. |
| 1474629 | 8/1974 | Australia. |
| 495075 | 8/1978 | Australia. |
| 6255/87 | 11/1987 | Denmark. |
| 84306264.7 | 9/1984 | European Pat. Off.. |
| 2824042 | 1/1978 | Fed. Rep. of Germany. |
| 965899 | 9/1950 | France. |
| 2230300 | 12/1974 | France. |
| 2584271 | 1/1987 | France. |
| 2613908 | 10/1988 | France. |
| 55-1784 | 1/1980 | Japan. |
| 57-198053 | 12/1982 | Japan. |
| 59-66845 | 4/1984 | Japan. |
| 59-74937 | 4/1984 | Japan. |
| NO81/00016 | 5/1981 | PCT Int'l Appl.. |
| AU82/00156 | 9/1982 | PCT Int'l Appl.. |
| US87/01307 | 6/1987 | PCT Int'l Appl.. |
| 1369198 | 11/1970 | United Kingdom. |
| 1567846 | 5/1980 | United Kingdom. |

OTHER PUBLICATIONS

Yamaguchi, Y., et al., "Effectiveness of Artificial Bait for Obtaining Higher Hooking Rate in Bottom-Set Long-Line Fishing," *Bulletin of the Japanese Society of Scientific Fisheries*, vol. 49, No. 12, pp. 1819-1824 (1983).

Kelco, *Structural Foods with the Algin/Calcium Reaction*, Jan. 1984.

ABBA Newsletter, 1986/1987.

Primary Examiner—Richard K. Seidel
Assistant Examiner—Chuck Y. Mah
Attorney, Agent, or Firm—Christensen, O'Connor, Johnson & Kindness

[57] ABSTRACT

An artificial bait comprises short lengths of randomly dispersed fibers, preferably rayon, a gellable binder, and an attractant, all disposed in a water matrix.

19 Claims, No Drawings

ARTIFICIAL BAIT FOR FISH AND SHELLFISH

RELATED APPLICATION

This application is a continuation-in-part of copending application Ser. No. 07/543,117, filed Jun. 22, 1990, and entitled Artificial Bait for Fish and Shellfish, now U.S. Pat. No. 5,062,235.

BACKGROUND OF THE INVENTION

The present invention relates to artificial bait and more particularly to an artificial bait adapted for fishing, and especially commercial fishing.

A variety of artificial fish baits have been developed using a variety of attractants in many delivery matrices. None of the baits developed thus far, however, are especially adapted to commercial fishing, for example longline fishing where the bait must be secured on a hook and then exposed to a salt water environment for a substantial period of time. Many of the prior artificial baits are not easily applied to a hook, especially when automatic baiting machines are employed to bait the hooks. Additionally, while the bait must remain on the hook for a long period of time upon contact with water, once the hook is retrieved to the fishing boat, the bait must also be easily removable from the hooks. Moreover, the bait must have the capability of allowing a timed release of the attractant from the bait to continuously attract fish to the hook over an extended period of time, must be biodegradable, and must have the feel of natural bait.

One artificial bait that attempts to meet the foregoing requirements is disclosed in Burreson et al., U.S. Pat. No. 4,882,174, issued Nov. 21, 1989. This patent discloses an artificial bait comprising a mat of randomly crossed fibers of a fibrous material, and a fluid mass of dissolved gelatin or pectin and attractant dispersed throughout the fibrous mat. While the bait is retained reasonably well on a hook, it is sometimes difficult to remove from the hook because the barb becomes caught in the fibrous mat. Moreover, because a fibrous mat is used, it is difficult to formulate and form into the desired shape. For example, it is difficult to thoroughly and evenly mix the mat, gel, and attractant disclosed by Burreson et al. Moreover, the bait of Burreson et al. can only be molded into a desired shape. It cannot be extruded and then cut into desired lengths because of the presence of the fibrous mat. In addition, the Burreson et al. formulation does not lend itself to continuous processing because of the time required in the mold for the gelatin- and pectin-based bait to set.

SUMMARY OF THE INVENTION

The desirable attributes of a good artificial bait are provided by the present invention, which comprises an artificial bait including a randomly dispersed fiber, an attractant, and a gellable binder selected from (a) alginates, (b) a mixture of carrageenan and locust bean gum, and (c) mixtures thereof. The binder is permeable to the attractant when in contact with water. In its preferred form, the bait comprises a mixture of from 2% to 8% gellable binder, from 1% to 4% fiber, from a trace to 40% attractant, the balance of the mixture being water. All percentages are by weight based on the total composition. Prior to gelling, the mixture is fluid and can easily be mixed so that the fibers and attractant are evenly distributed throughout the binder. The gelled mixture is then packaged for future use.

DETAILED DESCRIPTION OF THE INVENTION

An artificial bait formulated in accordance with the present invention has three primary ingredients: a bulk fiber, an attractant, and a gellable binder in which the attractant and fiber are randomly dispersed. The binder is permeable to the attractant when in contact with the water, that is, the attractant can slowly diffuse through the binder so that it, in effect, is released over a relatively long period of time. The gellable binder is a water soluble material, that can be mixed with the fiber and attractant in an aqueous solution and thereafter caused to gel, thus forming a solid or semi-solid final product that is water insoluble. Prior to gelling, the aqueous solution can be placed in a mold. The mold can take any of several forms including one that forms discrete chunks of bait, or preferably, an elongated continuous mold that forms a thin, elongated strip of bait that can be chopped into desired lengths, fed into an automatic baiting machine, and applied to a hook. Before the aqueous mixture gels, the mixture can also be extruded into a continuous mold to form an elongated strand of desired cross section. The strand can be coiled and stored, or if desired, can be cut into predetermined lengths for storage and application to a hook.

The fiber employed in the artificial bait in accordance with the present invention provides tensile strength to the bait. Without the fiber, the binder may fracture, especially when being applied to a hook. The fiber is most preferably biodegradable. Thus, if the bait drops from the hook or is ingested by a fish that is not caught, it will degrade without harm to the fish or to the environment. It must also be readily and economically available. Preferably, the fiber is purchased in a randomly dispersed bulk form. Natural cotton can be used, although a fiber such as rayon is most preferred because the desired fiber size and grade can readily be obtained on a commercial scale. The fibers actually cause the bait to be stronger after it has been frozen.

It is very important that the size, weight, and amount of fiber employed with the bait of the present invention be strictly controlled. The fiber must have the capability of being evenly distributed throughout the bait mass. It cannot form intertwining balls or ropes and cannot layer into mats. The amount of the fiber must be controlled so that prior to gelling the bait is flowable, mixable into a homogeneous mass, and can also be extruded. It is preferred that the fiber be incorporated into the bait in lengths of less than one and one-half inches, preferably in the range of from one-quarter to one and one-half inches and most preferably on the order of one-half to one inch. Longer fibers have a tendency to form ropes during the mixing process, especially when present in higher concentrations. For example, if the fibers are longer than one and one-half inches, they tend to form ropes or mats in the bait mixture as it is being prepared even when present in intermediate concentrations. Longer fibers also restrict dispersion of the attractant and make it more difficult to remove the bait from the hook after fishing. It is also preferred that the fineness, or denier, of the fiber be on the order of from three-quarters to three, more preferably from one to two, and most preferably one and one-half.

The binder employed in the artificial bait to carry the attractant and fiber formulated in accordance with the present invention must also meet certain criteria. The binder first must be nontoxic and biodegradable. The binder must be inert relative to the attractant, that is, it cannot adversely affect the primary purpose of the attractant. The binder must also be neutral to the fish with respect to smell and taste. The binder must also be flowable for purposes of mixing and extruding, preferably in an aqueous environment, and of course, must be gellable or settable to provide a firm final product. The binder must also have sufficient strength to stay on the hook while yet being relatively easily penetrable by the hook, but ultimately removable from the hook without significant effort. The binder must also have the ability to release the attractant over time upon exposure to water. Importantly, since the bait will be exposed to an aqueous environment, the gelled binder must be substantially water insoluble, while still being sufficiently hydrophilic to allow the attractant to leach out of the binder slowly.

Alginates and a mixture of carrageenan and locust bean gum best meet the desired characteristics for the binder. In addition, both readily bind water, thus providing an inexpensive bulking agent. When gelled both also have a fleshy texture, providing an appropriate "feel" for the fish. Both have a neutral taste and therefore do not repel the fish. Also, once gelled, the binder cannot be thermally reversed at temperatures less than 120° F. to 130° F. Thus, heat does not adversely effect the storage characteristics of the bait or use of the bait under normal atmospheric conditions, even on sunny, hot days.

The most preferred binder is a mixture of carrageenan and locust bean (carob seed) gum. Carrageenan is an aqueous gel-forming hydrocolloid found in several species of red algae and a seaweed called Irish moss. Locust bean gum is a hydrocolloid extracted from carob seeds. The carrageenan provides an excellent binder base. The locust bean gum makes the binder tougher, giving it added strength. It also renders the binder more flexible than carrageenan alone. The locust bean gum can be present in the hydrocolloid mixture in amounts from 20% to 80% by weight, preferably 40% to 60% by weight, and most preferably 50%. These percentages are by weight based on the total binder present.

The mixture of carrageenan and locust bean gum are gelled by heating an aqueous dispersion of the hydrocolloids and thereafter allowing it to cool. Normally heating the aqueous dispersion to a temperature on the order of 180° to 212° is sufficient. The material will then begin to gel when the dispersion is cooled to a temperature on the order of 80° to 90° F.

The most preferred alginate is commonly referred to as sodium alginate. Sodium alginate is the term normally applied to a linear copolymer composed of two monomeric units, D-mannuronic acid and L-guluronic acid. These copolymers are gelled in the presence of calcium ions. Calcium ions bind to adjacent sections of the alginate copolymer. An extensive discussion of the alginates and their gelling reactions is set forth in a pamphlet entitled *Structured Foods With The Algin/Calcium Reaction*, Technical Bulletin F-83, published by Kelco, 8355 Arrow Drive, San Diego, Calif. 92123, published 1984.

Alginate binders can be set by three different methods: diffusion, internal, and cooling. According to the present invention, it is most preferred to use the internal setting method, which is normally carried out at room temperature. The setting agent is released under controlled conditions from within the system, thus the name internal setting. The preferred setting agents include gypsum, dicalcium phosphate, calcium sulfate, and calcium sulfate dihydrate, with the most preferred being the latter. The rate at which the calcium is made available to the alginate molecules depends primarily on the pH and the amount, particle size, and intrinsic solubility characteristics of the particular calcium salts used. Small particle size and low pH, for example, promote rapid release of the calcium and thus rapid gelling.

It is most preferred that the calcium release be slowed so as to inhibit gel formation and thus allow easier handling of the aqueous solution prior to gelling. For this purpose, a calcium sequestrant is employed to control the gelling reaction by competing with the alginate for calcium ions. Typical sequestrants include sodium hexametaphosphate, tetrasodium pyrophosphate, and sodium citrate. For purposes of the present invention, a sequestrant containing a phosphate ion, and particularly disodium phosphate, is most preferred.

Both natural and synthetic attractants can be employed. Natural attractants can include ground herring, squid, and mackerel, either whole or selected parts of those sources. Most preferred is natural fresh herring without the heads, viscera, and tails. Other natural attractants include dried fish meal, natural amino acids, and other organic acids. Examples of synthetic attractants are described in the following publications: Carr et al., "Chemical Stimulation of Feeding Behavior in the Pinfish, Lagodon rhombiodes: A New Approach To An Old Problem", Comp. Biochem, Physiol., Vol. 54A, pp. 161–166 (1976); Carr et al., "Chemical Stimulation of Feeding Behavior in the Pinfish, Lagodon rhombiodes: Characterization and Identification of Stimulatory Substances Extracted From Shrimp" Comp. Biochem, Physiol., Vol. 54A, pp. 437–441 (1976); Carr et al, "Chemoreception and Feeding Behavior in the Pigfish, Orthopristics chrysopterus: Characterization and Identification of Stimulatory Substances in a Shrimp Extract," Comp. Biochem., Physiol., Vol. 55A, pp. 153-137. Both the natural and synthetic attractants can be incorporated into the bait in accordance with the present invention in either liquid or solid form.

Optional ingredients can also be employed in the artificial bait formulated in accordance with the present invention. These ingredients can include conventional preservatives, starch, and humectants.

Preferred embodiments of artificial bait can be formulated in accordance with the present invention by incorporating the principal ingredients in the following proportions:

| Ingredient | Preferred Range | Most Preferred Range |
| --- | --- | --- |
| Carrageenan and locust bean gum | | |
| fiber | 1% to 4% | 1¼% to 2¼% |
| carrageenan and locust bean gum | 2% to 8% | 3% to 5% |
| attractant | trace to 40% | 5% to 25% |
| optional ingredients | 0.0 to 10% | 0% to 5% |
| water | balance | balance |
| Alginates | | |
| fiber | 1% to 4% | 1¼% to 2¼% |
| alginate | 4% to 8% | 5% to 7% |
| setting agent | 0.5% to 4% | 2% to 3.5% |
| sequestrant | 0.1% to 3% | 1% to 2% |
| attractant | trace to 40% | 5% to 25% |
| optional ingredients | 0.0 to 10% | 0% to 5% |

| -continued | | |
|---|---|---|
| Ingredient | Preferred Range | Most Preferred Range |
| water | balance | balance |

The percentages used in the foregoing table are by weight based upon the total weight of the composition including water.

EXAMPLE 1

The following example is intended to illustrate to one of ordinary skill how to prepare an artificial bait in accordance with the invention disclosed herein. This example is not included as a of limitation but only exemplification.

An artificial bait is formulated in accordance with the present invention by placing 64.3 parts by weight water into a mixing container. Preferably deionized water or at least decalcified water is used. Rayon fibers having a length of one-half inch and a denier of one and one-half in the amount of 2.4 parts by weight are placed in the water. A gel mixture composed of 5.9 parts by weight of sodium alginate and 1.3 parts by weight sodium phosphate are also placed in the water. Attractant comprising ground herring without heads, viscera, or tails is also placed in the water in the amount of 20 parts by weight. The mixture is thoroughly stirred to ensure that the attractant and the fibers are completely randomly dispersed throughout the mixture. Thereafter an aqueous solution of setting agent comprising 2.7 parts by weight of calcium sulfate and 3.4 parts by weight of water are added to the mixture. The mixture is thereafter poured in a mold and allowed to set. The mixture sets in approximately one to three minutes. Thereafter the material is taken from the mold and frozen.

EXAMPLE 2

An artificial bait is formulated in accordance with the present invention by placing 74.2 parts by weight water in a mixing container. The water is then heated to boiling temperature (approximately 212° F.). Preferably, deionized water or at least decalcified water is used. Rayon fibers having a length of one-half inch and a denier of one and one-half in the amount of 2.0 parts by weight are placed in the water. A gel mixture composed of 3.8 parts by weight of a binder (approximately 50% carrageenan and 50% locust bean gum) are also placed in and thoroughly admixed with the water and the fibers using a high shear type mixer. When the water reaches a temperature of less than about 180° F., attractant comprising ground hearing without heads, viscera or tails is placed in the water in the amount of 20 parts by weight. Preferably, the ground herring are either at room temperature or refrigerated so that when they are placed in the hot water, the temperature of the water begins to rapidly fall, thus limiting the high temperature exposure of the attractant. While the temperature of the water is rapidly falling, the mixture is thoroughly stirred to ensure that the attractant and fibers are completely randomly dispersed throughout the mixture. When the temperature of the material approaches 120° to 130° F., it begins to gel and is extruded through an extrusion die. The mixture begins to firm up in a few minutes as the temperature falls below 120° F. The bait can be naturally cooled by exposure to room temperature air. If desired, the cooling can be accelerated by, for example, blowing cool air on the bait. After the bait has naturally cooled for approximately ten minutes, the resulting extruded rope can be coiled and placed in a container and frozen.

The bait prepared in accordance with the present invention can be stored for long periods of time when frozen. The bait needs to be removed from the freezer only a few hours before use and allowed to thaw at room temperature. Once thawed, the bait can be placed on a hook and the hook set.

Materials such as high fructose corn syrup, sorbitol, dextrose, and sucrose can be added to decrease the water activity of the bait and thereby increase shelf life of the bait in unfrozen form. These materials can be used in amounts from 25% to 40%, replacing water otherwise in the bait.

The present invention has been described in connection with preferred embodiments thereof. It is intended that one of ordinary skill can effect various alterations, substitutions of equivalents, and other changes without departing from the broad concepts disclosed herein. For example, while it is not preferred, mixtures of alginates, carrageenan, and locust bean gum can be employed as the binder. It is therefore intended that the Letters Patent granted hereon be limited only by the definition contained in the appended claims and the equivalents thereof.

The embodiments of the invention in which an exclusive property or privilege is claimed are defined as follows:

1. An artificial bait comprising:
   an attractant;
   a gellable binder comprising a mixture of carrageenan and locust bean gum, said binder being permeable to said attractant when in contact with water; and
   short fibers randomly and evenly dispersed throughout the binder, the fibers being present in an amount sufficient to provide strength to the binder while allowing the binder, attractant, and fibers to be readily mixable and flowable prior to gelling of the binder,
   the components being present in the following proportions:

| | |
|---|---|
| a mixture of carrageenan and locust bean gum | 2% to 8% |
| fiber | 1% to 4% |
| attractant | trace to 40% |
| water | balance, | all percentages by weight based on the total weight of the composition.

2. The bait of claim 1, wherein said fiber has a length of less than one and one-half inches and a denier of less than three.

3. The bait of claim 2, wherein said length is between one-quarter inch and one and one-half inches.

4. The bait of claim 3, wherein said length is preferably about one-half inch.

5. The bait of claim 2, wherein said denier is between three-quarters and three.

6. The bait of claim 5, wherein said denier is about one to about two.

7. The bait of claim 6, wherein said fiber is rayon or cotton.

8. The bait of claim 7, wherein said fiber is rayon.

9. The bait of claim 1 further comprising a humectant.

10. The bait of claim 1 further comprising a preservative.

11. The bait of claim 1, wherein the proportions are:

| | |
|---|---|
| a mixture of carrageenan and locust bean gum | 3% to 5% |
| fiber | 1¼% to 2¼% |
| attractant | 5% to 25% |
| water | balance |

12. A method for making an artificial bait comprising: forming a mixture of the following proportions:

| | |
|---|---|
| a mixture of carrageenan and locust bean gum | 2% to 8% |
| fiber | 1% to 4% |
| attractant | trace to 40% |
| water | balance | all percentages being by weight based on the total composition, said mixture having a elevated temperature; forming the resulting mixture into a shape and allowing said mixture to cool and thereby gel.

13. The method of claim 12, wherein said mixture has the following proportions:

| | |
|---|---|
| a mixture of carrageenan and locust bean gum | 3% to 5% |
| fiber | 1¼% to 2¼% |
| attractant | 5% to 25% |
| water | balance. |

14. The method of claim 13, wherein said fiber is rayon.

15. The method of claim 14, wherein said fiber has a length of less than one and one-half inches and a fineness of than three denier.

16. The method of claim 15, wherein said length of said rayon fiber is between one-quarter inch and one and one-half inches.

17. The method of claim 16, wherein the length of said rayon fiber is about one-half inch.

18. The method of claim 16, wherein said denier is between three-quarters and three.

19. The method of claim 18, wherein said denier is about 1 to 2.

* * * * *

UNITED STATES PATENT AND TRADEMARK OFFICE
CERTIFICATE OF CORRECTION

PATENT NO. : 5,197,219
DATED : March 30, 1993
INVENTOR(S) : H. T. Cook, Jr. et al.

It is certified that error appears in the above-identified patent and that said Letters Patent is hereby corrected as shown below:

| COLUMN | LINE | |
|---|---|---|
| [57]<br>Abstract | 4 | "disposed" should read --dispersed-- |
| 7<br>(Claim 12, | 22<br>Line 12) | "a" should read --an-- |
| 8<br>(Claim 15, | 14<br>Line 3) | after "of" insert --less-- |

Signed and Sealed this

Twenty-third Day of November, 1993

Attest:

BRUCE LEHMAN

*Attesting Officer*    *Commissioner of Patents and Trademarks*